(12) United States Patent
Jiang et al.

(10) Patent No.: US 11,751,159 B2
(45) Date of Patent: *Sep. 5, 2023

(54) RANGING BETWEEN A USER EQUIPMENT AND A FIXED REFERENCE NODE

(71) Applicant: QUALCOMM Incorporated, San Diego, CA (US)

(72) Inventors: Libin Jiang, Seattle, WA (US); Jubin Jose, Basking Ridge, NJ (US); Junyi Li, Franklin Park, NJ (US); Urs Niesen, Berkeley Heights, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/302,566

(22) Filed: May 6, 2021

(65) Prior Publication Data

US 2021/0258907 A1 Aug. 19, 2021

Related U.S. Application Data

(63) Continuation of application No. 16/399,460, filed on Apr. 30, 2019, now Pat. No. 11,064,510.

(Continued)

(51) Int. Cl.
*H04W 56/00* (2009.01)
*H04B 17/364* (2015.01)
(Continued)

(52) U.S. Cl.
CPC ...... *H04W 56/0065* (2013.01); *H04B 17/364* (2015.01); *H04W 4/023* (2013.01);
(Continued)

(58) Field of Classification Search
CPC ... H04W 56/0065; H04W 4/023; H04W 4/44; H04W 72/20; H04W 72/23; H04B 17/364
See application file for complete search history.

(56) References Cited

U.S. PATENT DOCUMENTS

| 6,681,099 B1 | 1/2004 | Keranen et al. |
| 8,320,341 B2 | 11/2012 | Malkamaki et al. |

(Continued)

FOREIGN PATENT DOCUMENTS

| CA | 2408761 A1 | 11/2001 |
| CN | 104205975 A | 12/2014 |

(Continued)

OTHER PUBLICATIONS

Andrew Solutions: "Uplink Signals for LTE Network based Positioning", R1-094485, 3GPP TSG RAN WG1 Meeting #59, Jeju, Korea, Nov. 9-Nov. 13, 2009, 4 pages.

(Continued)

*Primary Examiner* — Brenda H Pham
(74) *Attorney, Agent, or Firm* — Campbell C. Chiang

(57) ABSTRACT

In an embodiment, a user equipment (UE) receives, from a fixed reference node, at least one round-trip propagation time (RTT) ranging scheduling message indicating a set of downlink (DL) ranging resource assignments and a set of uplink (UL) ranging resource grants, receives one or more DL ranging signals from the fixed reference node on a first set of resources identified by the set of DL ranging resource assignments, and transmits one or more UL ranging signals to the fixed reference node on a second set of resources identified by the set of UL ranging resource grants.

30 Claims, 9 Drawing Sheets

Related U.S. Application Data

(60) Provisional application No. 62/678,250, filed on May 30, 2018.

(51) Int. Cl.
    *H04W 4/02*           (2018.01)
    *H04W 4/44*           (2018.01)
    *H04W 72/20*          (2023.01)
    *H04W 72/23*          (2023.01)

(52) U.S. Cl.
    CPC ............. *H04W 4/44* (2018.02); *H04W 72/20* (2023.01); *H04W 72/23* (2023.01)

(56) References Cited

U.S. PATENT DOCUMENTS

| | | |
|---|---|---|
| 8,325,612 B1 | 12/2012 | Ruiz et al. |
| 8,781,492 B2 | 7/2014 | Das et al. |
| 9,476,966 B2 | 10/2016 | Sridhara et al. |
| 9,699,607 B2 | 7/2017 | Markhovsky et al. |
| 9,807,637 B2 | 10/2017 | Bhatia et al. |
| 10,299,240 B2 | 5/2019 | Cui et al. |
| 10,645,723 B2 | 5/2020 | Xu et al. |
| 11,064,510 B2 * | 7/2021 | Jiang ................... H04W 72/23 |
| 2005/0025056 A1 | 2/2005 | Chen et al. |
| 2007/0127919 A1 * | 6/2007 | Kallstenius .......... H04B 10/071 398/25 |
| 2010/0017671 A1 | 1/2010 | Cai et al. |
| 2010/0103903 A1 | 4/2010 | Park et al. |
| 2011/0176461 A1 | 7/2011 | Astely et al. |
| 2011/0243261 A1 | 10/2011 | Bienas et al. |
| 2013/0235768 A1 | 9/2013 | Earnshaw et al. |
| 2013/0250772 A1 | 9/2013 | Yin |
| 2013/0294266 A1 * | 11/2013 | Lim ...................... H04W 24/10 370/252 |
| 2014/0334401 A1 | 11/2014 | Zhang et al. |
| 2015/0087330 A1 * | 3/2015 | Prechner ................. G01S 5/14 455/456.1 |
| 2016/0337805 A1 | 11/2016 | Liao et al. |
| 2016/0366554 A1 | 12/2016 | Markhovsky et al. |
| 2017/0156031 A1 | 6/2017 | Segev et al. |
| 2018/0019857 A1 | 1/2018 | Kazmi et al. |
| 2018/0132264 A1 | 5/2018 | Jung et al. |
| 2019/0190687 A1 | 6/2019 | Yi et al. |
| 2019/0285721 A1 | 9/2019 | Xiong et al. |
| 2020/0022160 A1 | 1/2020 | Zou et al. |

FOREIGN PATENT DOCUMENTS

| | | |
|---|---|---|
| CN | 107439033 A | 12/2017 |
| WO | WO-2009136732 A2 | 11/2009 |
| WO | 2010027213 A2 | 3/2010 |
| WO | WO-2011137396 A1 | 11/2011 |
| WO | WO-2013085750 A1 | 6/2013 |
| WO | 2016024831 A1 | 2/2016 |
| WO | WO-2016181197 A1 | 11/2016 |
| WO | WO-2017053181 A1 | 3/2017 |
| WO | WO-2017117424 A1 | 7/2017 |
| WO | 2017139097 A1 | 8/2017 |

OTHER PUBLICATIONS

International Search Report and Written Opinion—PCT/US2019/030237—ISA/EPO—dated Jun. 27, 2019.

* cited by examiner

RANGING BETWEEN A USER EQUIPMENT AND A FIXED REFERENCE NODE

CROSS-REFERENCE TO RELATED APPLICATION

The present application for patent is a continuation of prior U.S. patent application Ser. No. 16/399,460, entitled "RANGING BETWEEN A USER EQUIPMENT AND A FIXED REFERENCE NODE", filed Apr. 30, 2019, which claims the benefit of U.S. Provisional Patent Application No. 62/678,250, entitled, "RANGING BETWEEN A USER EQUIPMENT AND A FIXED REFERENCE NODE", filed May 30, 2018, both of which are assigned to the assignee hereof and hereby expressly incorporated herein by reference in their entirety.

TECHNICAL FIELD

Various aspects described herein generally relate to ranging between a user equipment (UE) and a fixed reference node.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Providing accurate ranging to user equipments (UEs) in cellular networks has many applications, where ranging here refers to the determination of distance between a UE and a fixed reference node (e.g., a base station, etc.) with a known location. For example, the UE may engage in N ranging procedures with N fixed reference nodes to determine N associated UE-to-node distances, which are then used to determine or refine a positioning estimate for the UE.

For vehicle-integrated UEs, accurate ranging and positioning are critical for collision avoidance and autonomous driving. For pedestrian UEs, accurate ranging and positioning are useful for road safety and urban navigation. Current GPS positioning can provide accuracy of ~2-3 meters in open-sky conditions, and this accuracy degrades in deep urban environment to tens of meters where GPS signals are blocked or reflected. To improve GPS accuracy, accurate ranging between UE and fixed reference nodes is useful. For example, fixed reference nodes are stationary and can store their known locations (e.g., accurate predetermined positions). By conducting ranging between UEs and fixed reference nodes, the resultant UE-to-node distances can be combined with GPS measurements to improve the accuracy of positioning estimates for the UEs.

Typically, ranging requires the measurement of signal propagation time between two nodes (e.g., a UE and a fixed reference node). Due to the clock offset between the two nodes, one-way propagation time measurement has a bias, which can be cancelled by measuring a round-trip propagation time (i.e., RTT). Accordingly, ranging procedures as described herein may alternatively be referred to as RTT ranging procedures, as the RTT is generally calculated and then divided by 2 to derive an averaged one-way propagation time measurement.

SUMMARY

An embodiment is directed to a method of operating a user equipment (UE), comprising receiving, from a fixed reference node, at least one round-trip propagation time (RTT) ranging scheduling message indicating a set of downlink (DL) ranging resource assignments and a set of uplink (UL) ranging resource grants, receiving one or more DL ranging signals from the fixed reference node on a first set of resources identified by the set of DL ranging resource assignments, and transmitting one or more UL ranging signals to the fixed reference node on a second set of resources identified by the set of UL ranging resource grants.

Another embodiment is directed to a method of operating a fixed reference node, comprising transmitting, to at least one user equipment (UE), at least one round-trip propagation time (RTT) ranging scheduling message indicating a set of DL ranging resource assignments and a set of uplink (UL) ranging resource grants, transmitting, to the at least one UE, one or more downlink (DL) ranging signals on a first set of resources identified by the set of DL ranging resource assignments, and receiving, from the at least one UE, one or more UL ranging signals on a second set of resources identified by the set of UL ranging resource grants.

Another embodiment is directed to a user equipment (UE), comprising means for receiving, from a fixed reference node, at least one round-trip propagation time (RTT) ranging scheduling message indicating a set of downlink (DL) ranging resource assignments and a set of uplink (UL) ranging resource grants, means for receiving one or more DL ranging signals from the fixed reference node on a first set of resources identified by the set of DL ranging resource assignments, and means for transmitting one or more UL ranging signals to the fixed reference node on a second set of resources identified by the set of UL ranging resource grants.

Another embodiment is directed to a fixed reference node, comprising means for transmitting, to at least one user equipment (UE), at least one round-trip propagation time (RTT) ranging scheduling message indicating a set of DL ranging resource assignments and a set of uplink (UL) ranging resource grants, means for transmitting, to the at least one UE, one or more downlink (DL) ranging signals on a first set of resources identified by the set of DL ranging resource assignments, and means for receiving, from the at least one UE, one or more UL ranging signals on a second set of resources identified by the set of UL ranging resource grants.

Another embodiment is directed to a user equipment (UE), comprising a memory, at least one transceiver, and at least one processor coupled to the memory and the at least one transceiver and configured to receive, from a fixed reference node, at least one round-trip propagation time (RTT) ranging scheduling message indicating a set of downlink (DL) ranging resource assignments and a set of uplink (UL) ranging resource grants, receive one or more DL ranging signals from the fixed reference node on a first set of resources identified by the set of DL ranging resource assignments, and transmit one or more UL ranging signals to the fixed reference node on a second set of resources identified by the set of UL ranging resource grants.

Another embodiment is directed to a fixed reference node, comprising a memory, at least one transceiver, and at least one processor coupled to the memory and the at least one transceiver and configured to transmit, to at least one user equipment (UE), at least one round-trip propagation time (RTT) ranging scheduling message indicating a set of DL ranging resource assignments and a set of uplink (UL) ranging resource grants, transmit, to the at least one UE, one or more downlink (DL) ranging signals on a first set of resources identified by the set of DL ranging resource assignments, and receive, from the at least one UE, one or more UL ranging signals on a second set of resources identified by the set of UL ranging resource grants.

Another embodiment is directed to a non-transitory computer-readable medium containing instructions stored thereon, which, when executed by a user equipment (UE), cause the UE to perform operations, the instructions comprising at least one instruction configured to cause the UE to receive, from a fixed reference node, at least one round-trip propagation time (RTT) ranging scheduling message indicating a set of downlink (DL) ranging resource assignments and a set of uplink (UL) ranging resource grants, at least one instruction configured to cause the UE to receive one or more DL ranging signals from the fixed reference node on a first set of resources identified by the set of DL ranging resource assignments, and at least one instruction configured to cause the UE to transmit one or more UL ranging signals to the fixed reference node on a second set of resources identified by the set of UL ranging resource grants.

Another embodiment is directed to a non-transitory computer-readable medium containing instructions stored thereon, which, when executed by a fixed reference node, cause the fixed reference node to perform operations, the instructions comprising at least one instruction configured to cause the fixed reference node to transmit, to at least one user equipment (UE), at least one round-trip propagation time (RTT) ranging scheduling message indicating a set of DL ranging resource assignments and a set of uplink (UL) ranging resource grants, at least one instruction configured to cause the fixed reference node to transmit, to the at least one UE, one or more downlink (DL) ranging signals on a first set of resources identified by the set of DL ranging resource assignments, and at least one instruction configured to cause the fixed reference node to receive, from the at least one UE, one or more UL ranging signals on a second set of resources identified by the set of UL ranging resource grants.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
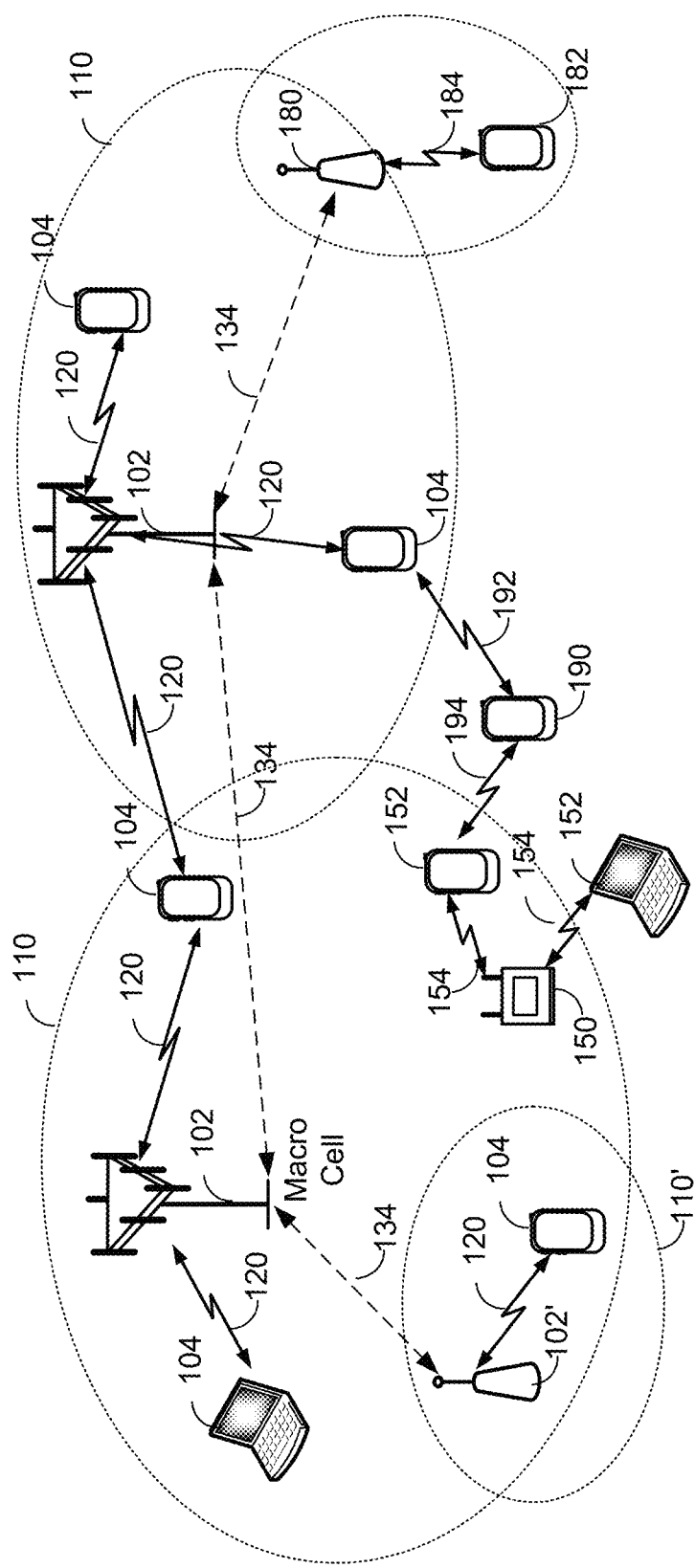
FIG. 1 illustrates an exemplary wireless communications system, according to various aspects.

Various aspects described herein generally relate to ranging between a user equipment (UE) and a fixed reference node.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 702.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include roadside units (RSUs), femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, the small cell 102' may have a geographic coverage area 110' that substantially overlaps with the geographic coverage area 110 of one or more macro base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 4 GHz). When communicating in an unlicensed frequency spectrum, the WLAN STAs 152 and/or the WLAN AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE or 5G technology and use the same 4 GHz unlicensed frequency spectrum as used by the WLAN AP 150. The small cell 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA (or UE) 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Referring to FIG. 1, some or all of the base stations 102 and/or 180, the WLAN AP 150 may be operable as fixed reference nodes having known locations (e.g., accurate predetermined positions) for use in conjunction with RTT ranging procedures with mobile nodes or UEs. Moreover, certain UEs may also at least temporarily be operable as fixed reference nodes. For example, in addition to permanently installed network RSUs, a vehicle-integrated UE may function as an RSU when the vehicle is engaged in a parked state. In this case, the vehicle-integrated UE in the parked vehicle may be available for use as a fixed reference node in association with RTT ranging procedures with mobile nodes or UEs until the vehicle begins driving again.

Figure 2A:
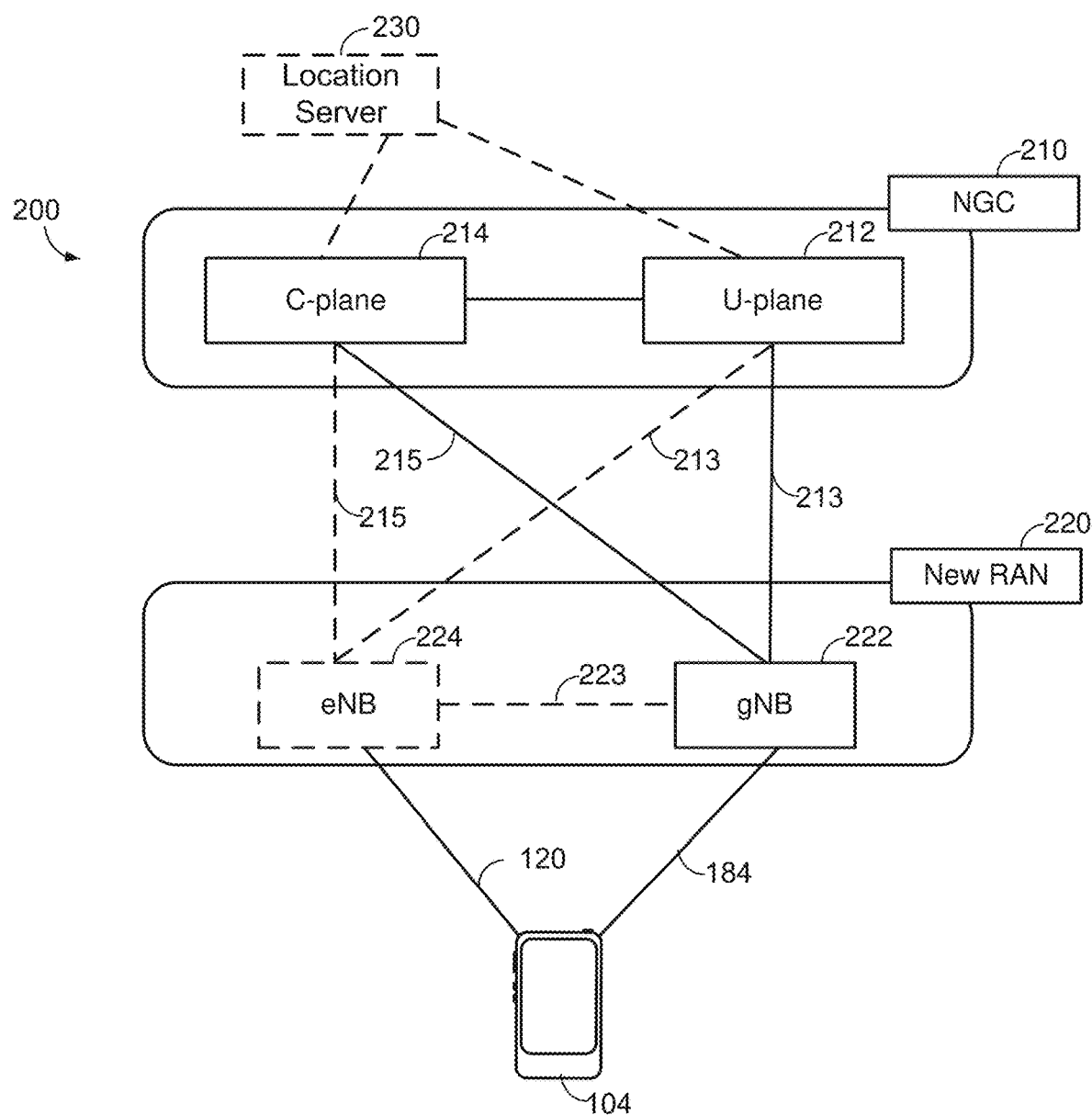
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
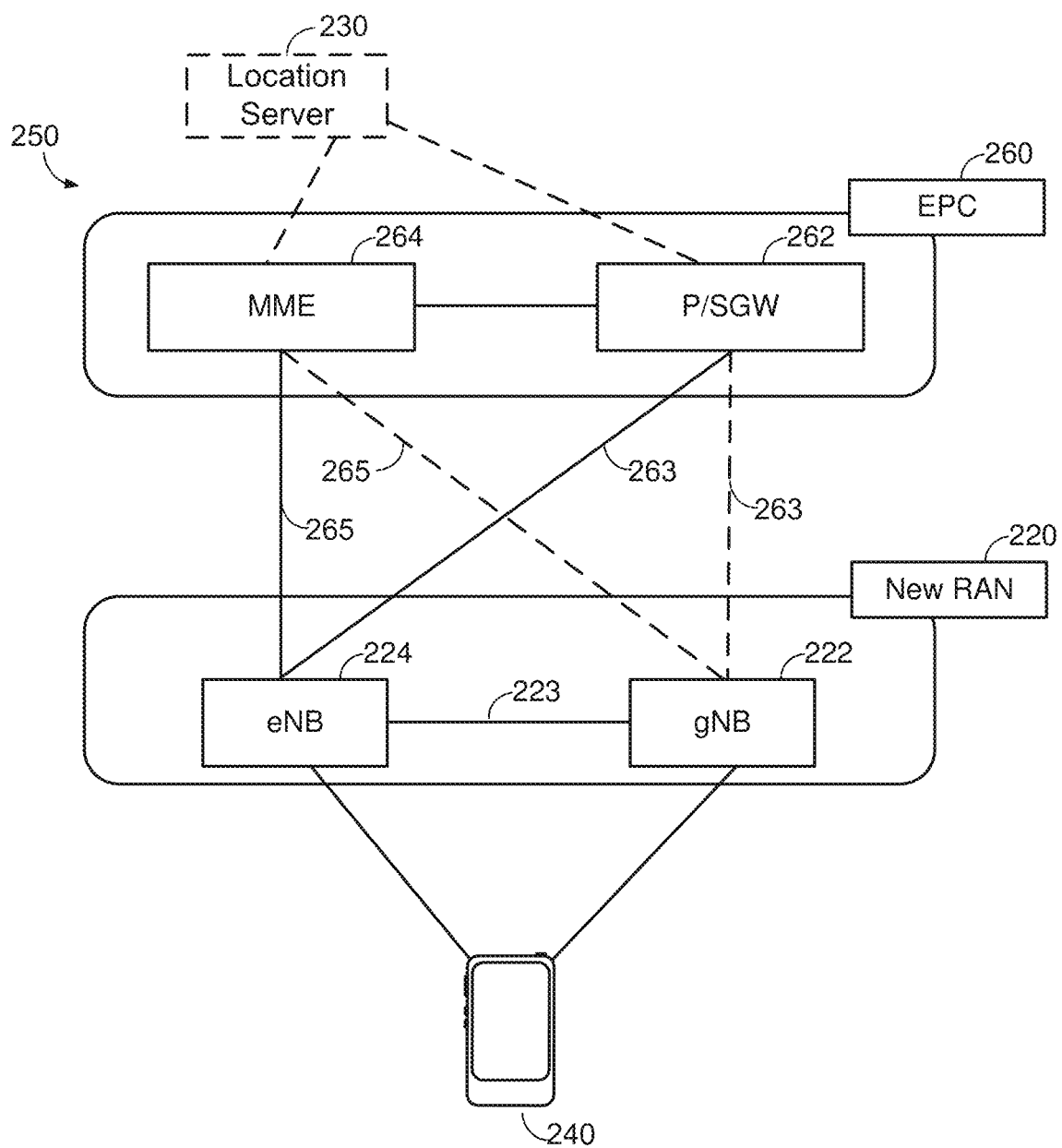

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW), 262, which operate cooperatively to form the core network. 51 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3:
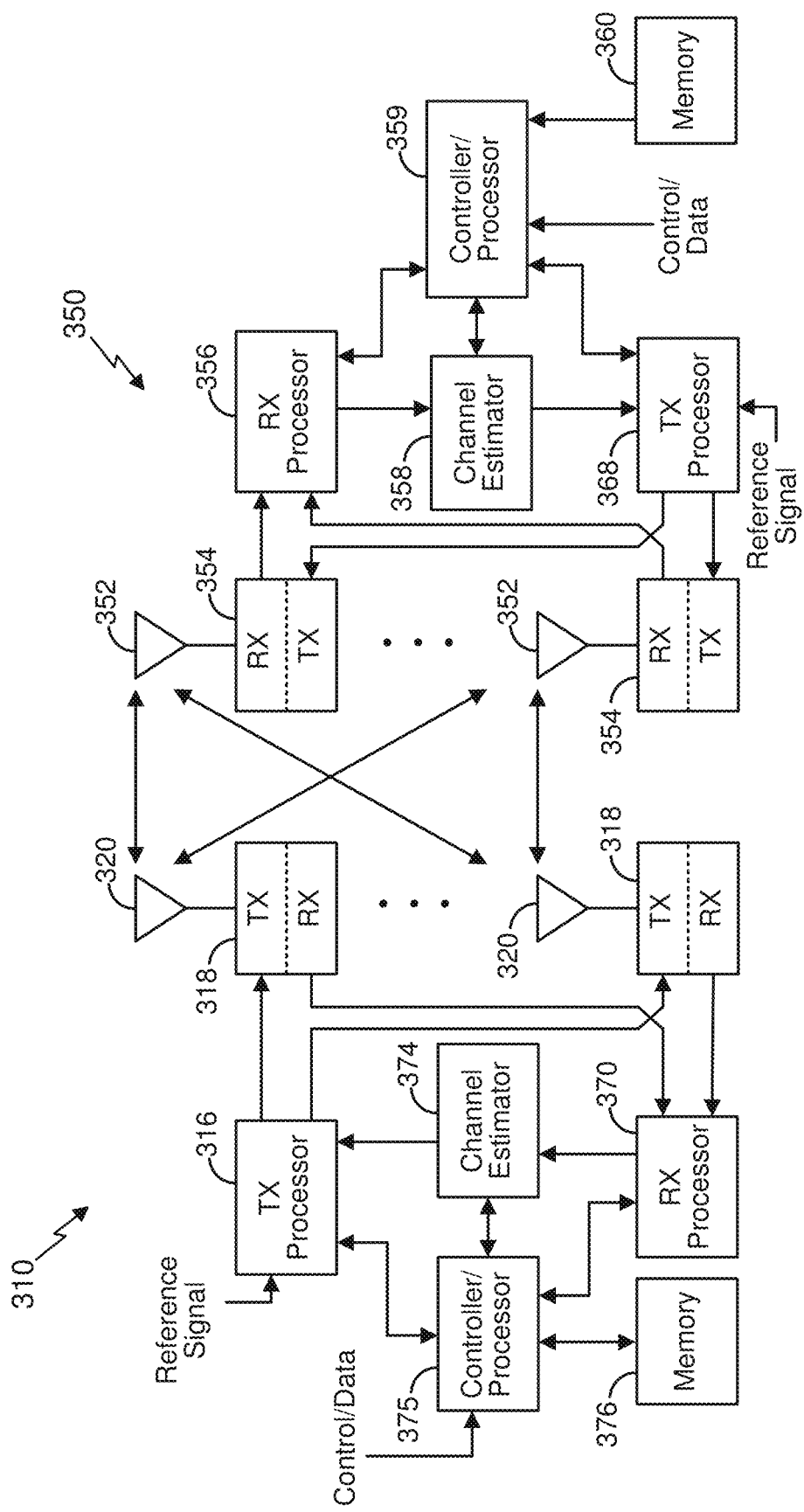
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, a fixed reference node, an RSU, etc.) in communication with an exemplary UE 350 (e.g., a vehicle-integrated UE, a pedestrian UE or UE that is operated by a human independently of a vehicle, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

5G (New Radio, or NR) offers more flexibility in terms of downlink (DL) and uplink (UL) resource allocation compared to 4G LTE and earlier generations. In 5G, a slot contains 14 OFDM symbols and has a duration of 1 ms, 0.5 ms, or 0.25 ms, etc. Moreover, a slot can be scheduled so as to contain both DL and UL symbols, with the UL symbols being granted to a single UE or multiple UEs. By leveraging these capabilities, a two-way RTT ranging procedure can be completed relatively quickly in a single slot, which may mitigate the problem of clock drift (e.g., by contrast, RTT ranging procedures performed over a larger duration such as 1 second may be impacted by clock drift). Moreover, multiple UEs may separately participate in respective RTT ranging procedures in the same slot by tuning to the same DL resources containing ranging signals from the fixed reference node, while being allocated separate UL resources for transmitting UL ranging signals back to the fixed reference node.

Figure 4:
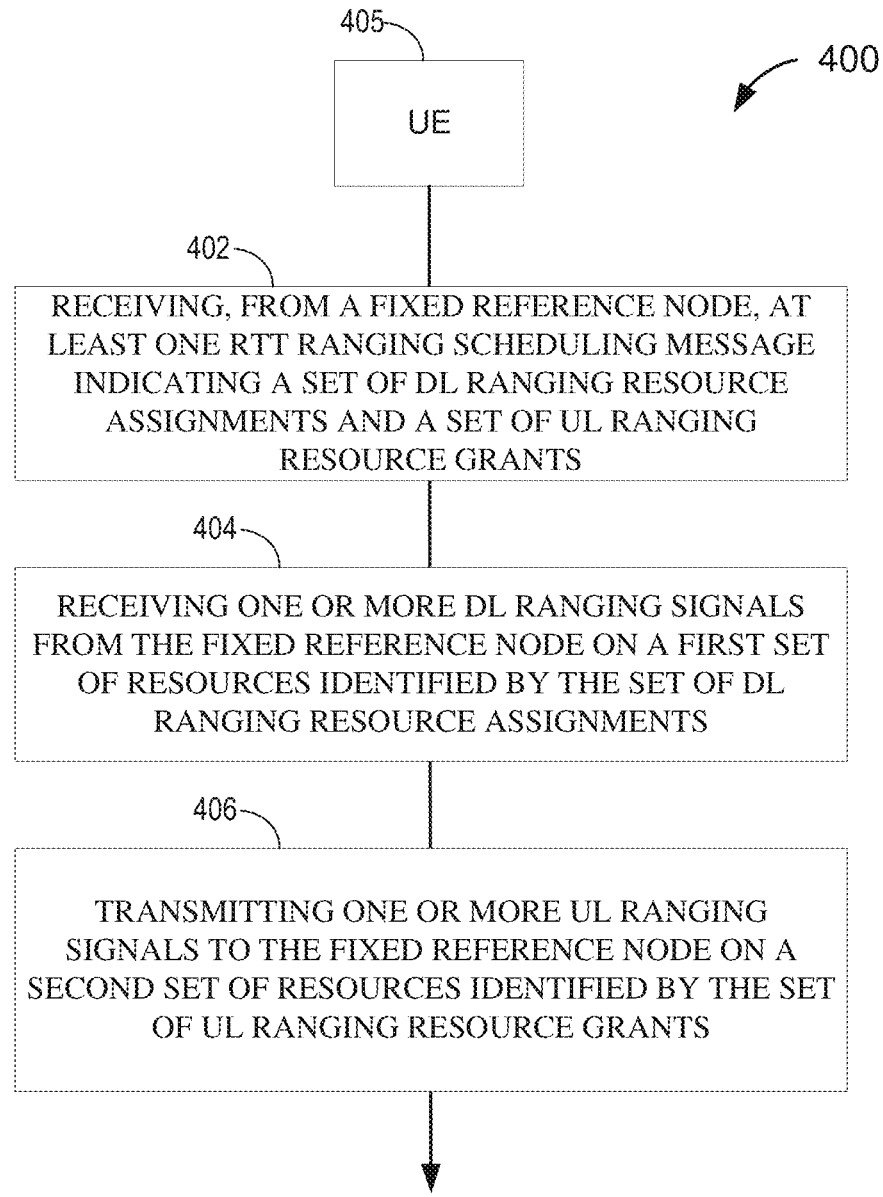
FIG. 4 illustrates a round-trip propagation time (RTT) ranging procedure in accordance with an embodiment of the disclosure.

FIG. 4 illustrates an RTT ranging procedure 400 in accordance with an embodiment of the disclosure. The RTT ranging procedure 400 is performed at a UE 405, which may correspond to any of the above-described UEs, such as UE 350 of FIG. 3.

Referring to FIG. 4, at 402, the UE 405 receives, from a fixed reference node, at least one RTT ranging scheduling message indicating a set of DL ranging resource assignments and a set of UL ranging resource grants. In an example, the fixed reference node is stationary (at least temporarily), has a known and accurate location, and may correspond to a base station, an RSU, and so on, as described above with respect to FIG. 3.

Referring to FIG. 4, at 404, the UE 405 receives one or more DL ranging signals from the fixed reference node on a first set of resources identified by the set of DL ranging resource assignments. In an example, at 404, the UE 405 measures a time of arrival (ToA) of the one or more DL ranging signals at the UE 405. At 406, the UE 405 transmits one or more UL ranging signals to the fixed reference node on a second set of resources identified by the set of UL ranging resource grants. It will be appreciated that 404 and 406 may be executed in any order (i.e., 404 followed by 406, or 406 followed by 404). In an example, the first and second sets of resources may each correspond to a set of symbols in an associated set of frequencies in accordance with a time division duplex (TDD) scheme, a set of codes in accordance with a code division multiple access (CDMA) scheme, or a combination of symbols and codes in accordance with a hybrid TDD/CDMA scheme.

Figure 5:
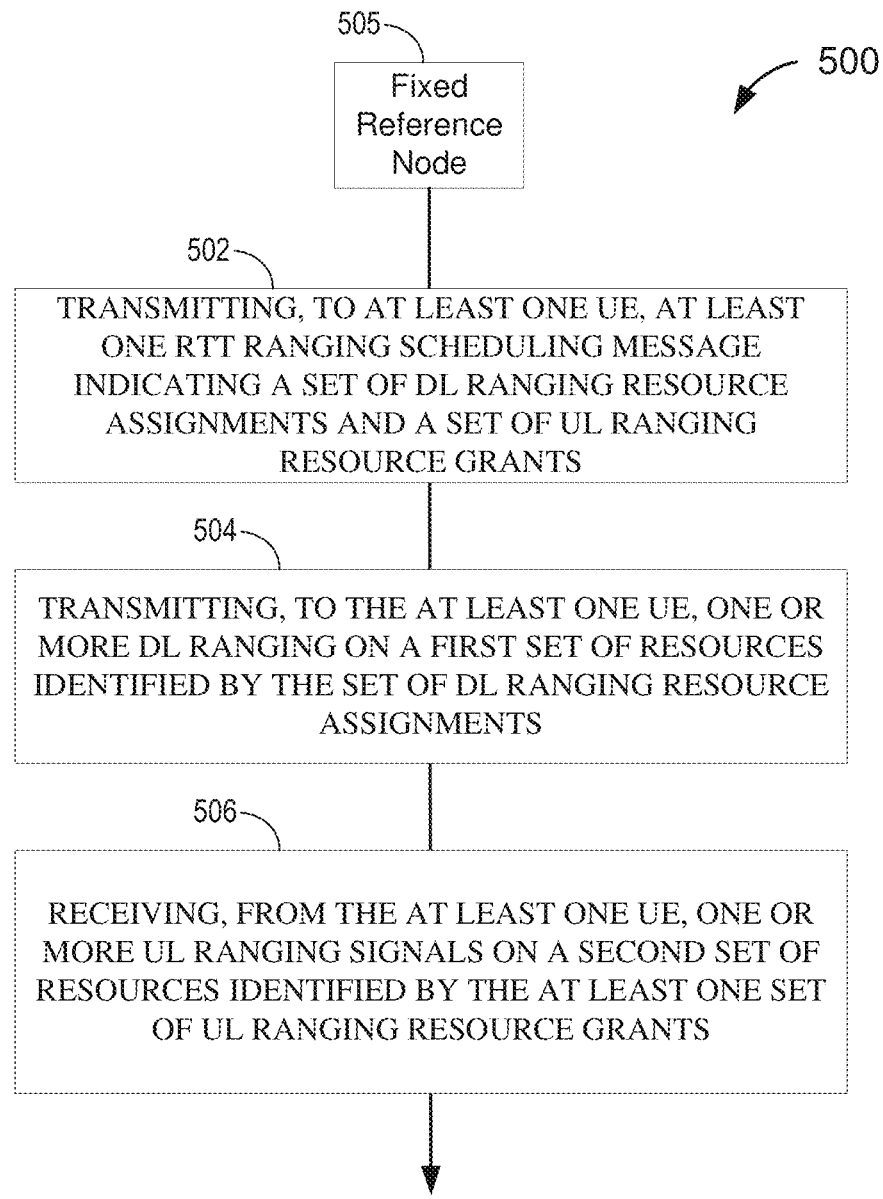
FIG. 5 illustrates an RTT ranging procedure in accordance with another embodiment of the disclosure.

FIG. 5 illustrates an RTT ranging procedure 500 in accordance with another embodiment of the disclosure. The RTT ranging procedure 500 is performed at a fixed reference node 505. In an example, the fixed reference node 505 is stationary (at least temporarily), has a known and accurate location, and may correspond to a base station, an RSU, and so on, as described above with respect to FIG. 3. Generally, the respective RTT ranging procedures 400-500 are performed in conjunction with each other, with the RTT ranging procedure 400 corresponding to the UE-implemented operations and the RTT ranging procedure 500 corresponding to the fixed reference node-implemented operations.

Referring to FIG. 5, at 502, the fixed reference node 505 transmits, to at least one UE, at least one RTT ranging scheduling message indicating a set of DL ranging resource assignments and a set of UL ranging resource grants. In an example, the at least one RTT ranging scheduling message sent at 502 may correspond to the at least one RTT ranging scheduling message received at the UE 405 as described above with respect to 402 of FIG. 4.

Referring to FIG. 5, at 504, the fixed reference node 505 transmits, to the at least one UE, one or more DL ranging signals on a first set of resources identified by the set of DL ranging resource assignments. In an example, the one or more DL ranging signals sent at 504 may correspond to the one or more DL ranging signals received at the UE 405 as described above with respect to 404 of FIG. 4.

Referring to FIG. 5, at 506, the fixed reference node 505 receives, from the at least one UE, one or more UL ranging signals on a second set of resources identified by the set of UL ranging resource grants. In an example, at 506, the fixed reference node 505 measures a time of arrival (ToA) of the one or more DL ranging signals at the UE 405. In an example, the one or more UL ranging signals sent at 504 may correspond to the one or more UL ranging signals sent at the UE 405 as described above with respect to 406 of FIG. 4. Further, it will be appreciated that 504 and 506 may be executed in any order (i.e., 504 followed by 506, or 506 followed by 504).

Referring now to 402 of FIG. 4 and 502 of FIG. 5, in a first example, the RTT ranging procedures 400-500 may be UE-initiated, whereby the at least one RTT ranging scheduling message at 402/502 is transmitted in response to a ranging scheduling request transmitted by the UE 405 to the fixed reference node 505 (or another network component that schedules the RTT ranging procedure 400 on behalf of the fixed reference node and/or other fixed reference nodes). In a second example, the RTT ranging procedures 400-500 may be network-initiated, whereby the at least one RTT ranging scheduling message at 402 is triggered by a network component that desires to determine a positioning estimate for the UE 405.

Still referring to 402 of FIG. 4 and 502 of FIG. 5, in a first example, the at least one RTT ranging scheduling message may be sent by the fixed reference node 505 to the UE 405 at least in part via a unicast protocol, whereby the set of UL ranging resource grants are each allocated to the UE 405. In a second example, the RTT ranging scheduling message may be sent by the fixed reference node 505 to the UE 405 at least in part via a multicast or broadcast protocol. For example, the at least one RTT ranging scheduling message may include a first RTT ranging scheduling message that indicates the set of DL ranging resource assignments via multicast/broadcast to a group of UEs for which an RTT ranging procedure is scheduled in a particular slot or scheduling interval, and a second RTT ranging scheduling message that indicates the set of UL ranging resource grants specifically to the UE 405 via unicast. In this case, other unicasted second RTT ranging scheduling message(s) may likewise be sent to other UE(s) being scheduled with respect to the RTT ranging procedure.

Still referring to 402 of FIG. 4 and 502 of FIG. 5, in an example, the ranging scheduling message may be configured to indicate that the set of DL ranging resource assignments and the set of UL ranging resource grants are scheduled in accordance with a semi-persistent scheduling (SPS) protocol, which is supported at least by 4G and/or 5G networks. In this case, the set of DL ranging resource assignments and the set of UL ranging resource grants map to resources that repeat at a given interval (or ranging slot). Accordingly, if a UE is required to perform RTT ranging once every 2 seconds, the at least one ranging scheduling message may specify the set of DL ranging resource assignments and the set of UL ranging resource across ranging slots at 2 second intervals. In this case, a new ranging scheduling message need not be sent to the UE for each respective ranging slot where an RTT ranging procedure is to be performed. However, SPS-based scheduling is not expressly required and need not be used for the ranging scheduling message(s) in other embodiments, which may use ad-hoc or dynamic resource scheduling.

Referring to 404-406 of FIG. 4 or 504-506 of FIG. 5, each DL and UL ranging signal may be transmitted in accordance with a given sequence and with a particular sequence identifier. In an example, the sequence identifier(s) may be specified by the ranging scheduling message at 402 or 502. In another example, different sequence identifiers may be assigned to different UEs to facilitate CDMA.

As will be described in more detail below with respect to FIG. 7, the ToAs of the respective UL and DL ranging signals at the UE 405 and the fixed reference node 505 may be used to compute the RTT between the UE 405 and the fixed reference node 505, which may then be used in conjunction with determination or refinement of a positioning estimate for the UE 405.

Figure 6:
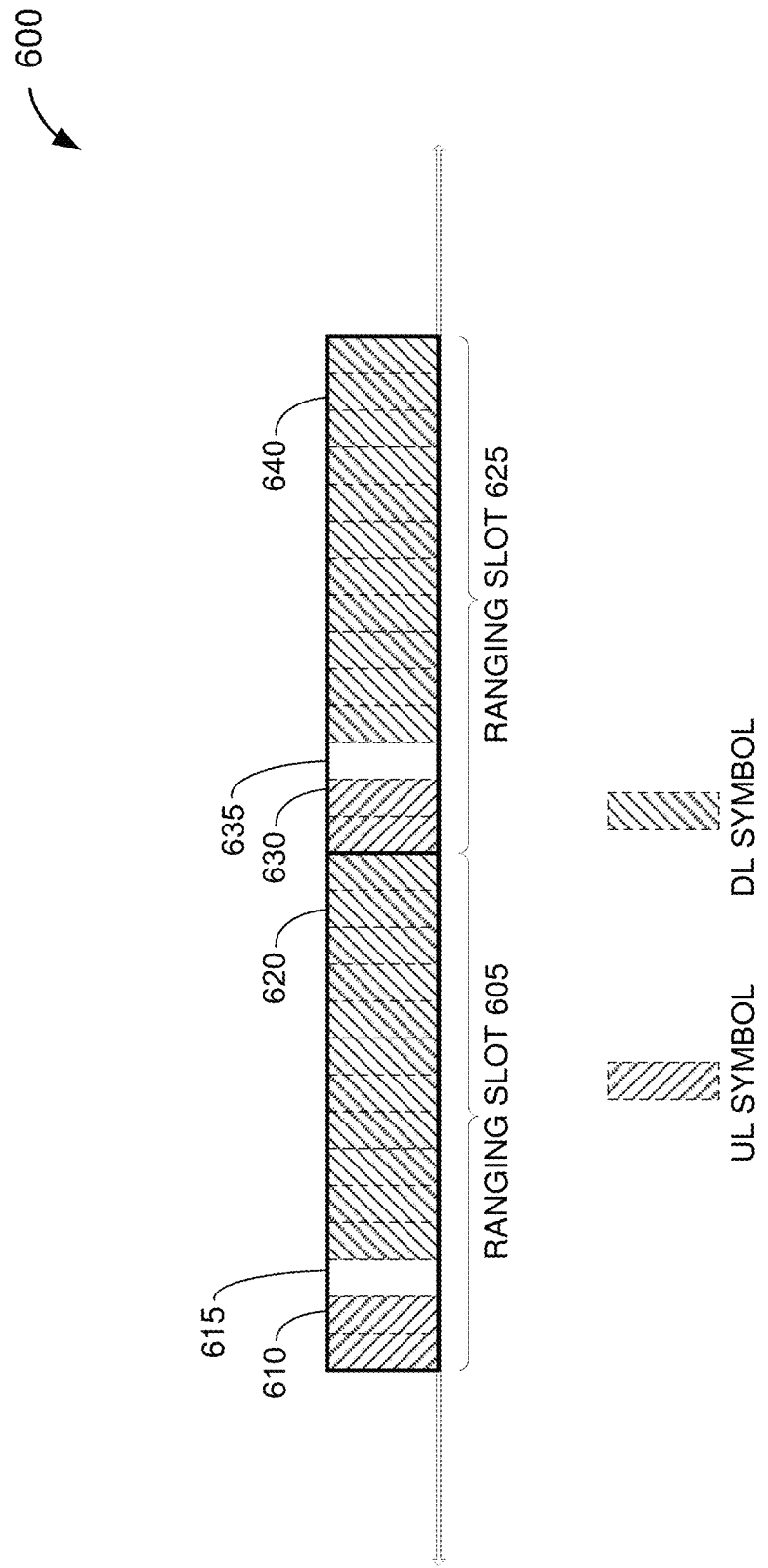
FIG. 6 illustrates an exemplary ranging slot format in accordance with an embodiment of the disclosure.

FIG. 6 illustrates an exemplary ranging slot format 600 in accordance with an embodiment of the disclosure. Referring to FIG. 6, a first ranging slot 605 includes a plurality of symbols; in particular, a set of DL symbols 610, followed by a DL-to-UL transition symbol 615, followed by a set of UL symbols 620. The set of DL symbols 610 correspond to the first set of resources on which the fixed reference node transmits the one or more DL ranging signals as described above with respect to 404 of FIG. 4 or 504 of FIG. 5. At least a portion of the set of UL symbols 620 corresponds to the second set of resources on which the UE(s) transmit the one or more UL ranging signals as described above with respect to 406 of FIG. 4 or 506 of FIG. 5. For example, with respect to an RTT ranging procedure involving multiple UEs, each of the multiple UEs tune to the same DL ranging signals on the set of DL symbols 610, whereas each of the multiple UEs are allocated their own UL symbols for transmission of their respective UL ranging signals from among the set of UL symbols 620.

Referring to FIG. 6, a second ranging slot 625 follows the first ranging slot 605 and similarly includes a plurality of symbols; in particular, a set of DL symbols 630, followed by a DL-to-UL transition symbol 635, followed by a set of UL symbols 640. The configuration of the second ranging slot 625 may generally be the same as the first ranging slot 605. However, the number and/or identity of the UEs may change from ranging slot to ranging slot, as different combinations of UEs may perform RTT ranging procedures from slot to slot.

Referring to FIG. 6, DL-to-UL transition symbol 615 or 635 is a gap or spacer between the DL and UL symbols that is unassigned (or left empty) to reduce or avoid DL/UL collisions. In an example, only one DL-to-UL transition symbol is required per ranging slot so long as all DL symbols and UL symbols fall on different sides of the DL-to-UL transition symbol. Also, while shown in FIG. 6 as a single symbol, the DL-to-UL transition symbol 615 or 635 may span multiple symbols in other embodiments (e.g., if only a few UEs need to be scheduled in a particular ranging slot, etc.).

Referring to FIG. 6, the specific number of symbols included among the UL and DL symbols is configurable, and may vary based on the number of UEs to be scheduled for RTT ranging in a particular ranging slot.

While not shown expressly in FIG. 6, each respective symbol is a unit of time that is associated with a particular bandwidth. The combination of a symbol and associated bandwidth may be referred to as a "resource block". A resource block may be further shared by multiple nodes in context with a CDMA-type implementation. In an example, ranging accuracy scales with the allotted bandwidth, so ranging signals may be configured to occupy a relatively large bandwidth (e.g., between ~10 MHz and ~500 MHz).

Figure 7:
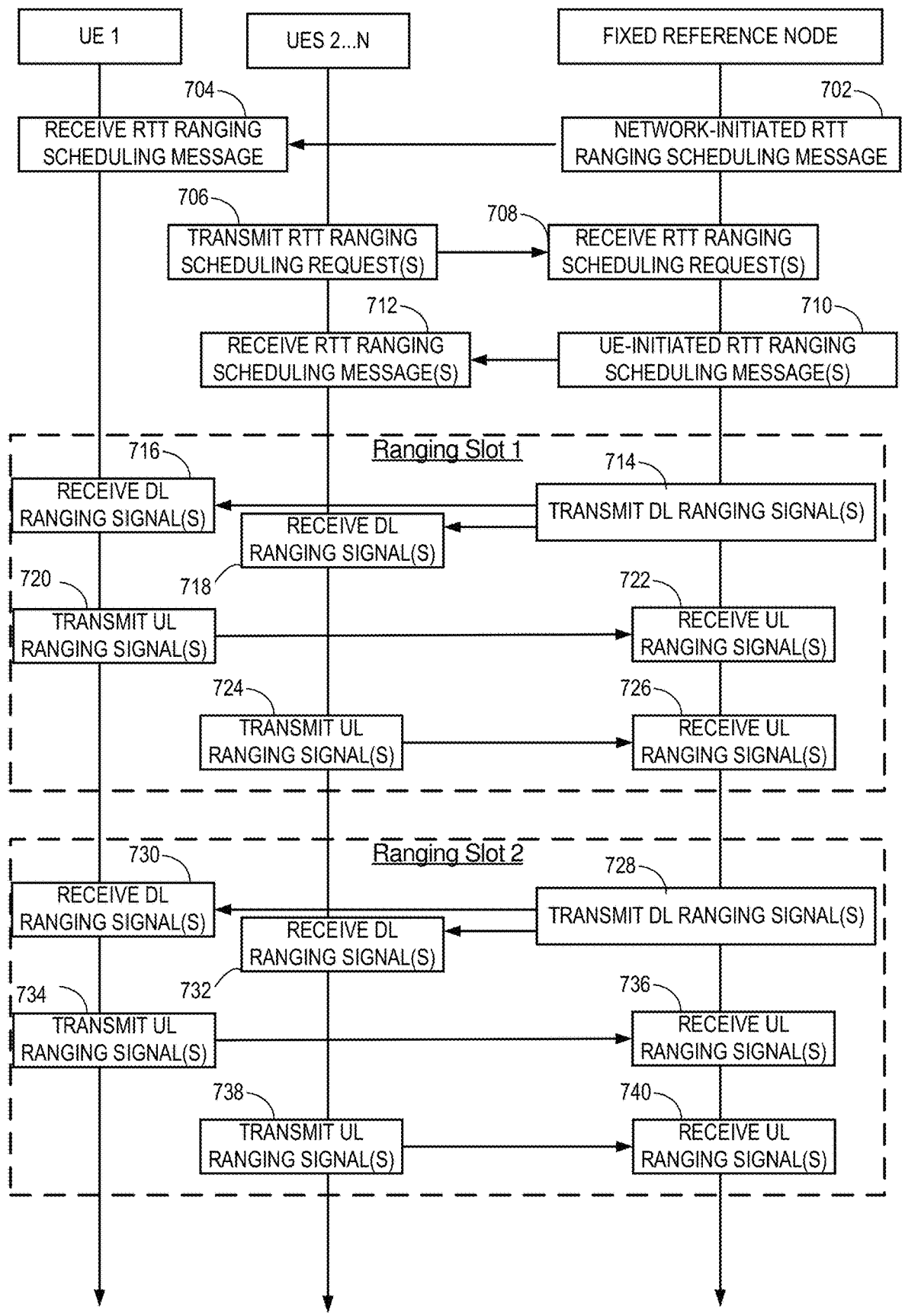
FIG. 7 illustrates an example implementation of the RTT ranging procedures of FIGS. 4-5 in accordance with an embodiment of the disclosure.

FIG. 7 illustrates an example implementation of the RTT ranging procedures 400-500 of FIGS. 4-5 in accordance with an embodiment of the disclosure.

Referring to FIG. 7, at 702 (e.g., as in 502 of FIG. 5), a fixed reference node transmits at least one RTT ranging scheduling message to UE 1 that indicates a set of DL ranging resource assignments and a set of UL ranging resource grants for UE 1. In the embodiment of FIG. 7, the at least one RTT ranging scheduling message of 702-704 is part of a network-initiated RTT ranging procedure (e.g., triggered by an entity other than the UE 1, such as a server that provides a location-based service to UE 1). At 704 (e.g., as in 402 of FIG. 4), UE 1 receives the RTT ranging scheduling message.

Referring to FIG. 7, at 706, UEs 2 ... N (e.g., whereby N is greater than or equal to 2) each transmit an RTT ranging scheduling request to the fixed reference node. At 708, the fixed reference node receives the RTT ranging scheduling request(s) from UEs 2 ... N. At 710 (e.g., as in 502 of FIG. 5), the fixed reference node transmits at least one RTT ranging scheduling message to each of UEs 2 ... N indicating, to each of UEs 2 ... N, the set of DL ranging resource assignments (e.g., which designate the same DL ranging resource assignments sent to UE 1 at 702) and a set of UL ranging resource grants for each respective UE, and the at least one RTT ranging scheduling message is received at UEs 2 ... N at 712. In particular, each of UEs 1 ... N may be allocated a different set of UL ranging resource grants associated with different UL resources. In contrast to 702-704, the RTT ranging scheduling message(s) are part of UE-initiated RTT ranging procedure(s) (e.g., triggered by the respective UE involved with the respective RTT ranging procedure).

In the embodiment of FIG. 7, assume that UEs 1 ... N are each setup to perform their respective RTT ranging procedures in the same ranging slot ("Ranging Slot 1"). Accordingly, at 714 (e.g., as in 504 of FIG. 5), the fixed reference node 505 transmits one or more DL ranging signals to UEs 1 ... N on a first set of resources identified by the set of DL ranging resource assignments in the RTT ranging scheduling messages of 702-704 and 712-714. At 716-718 (e.g., as in 404 of FIG. 5), each of UEs 1 ... N receive the one or more DL ranging signals. In particular, at 716-718, UEs 1 ... N each measure respective ToAs of the one or more DL ranging signals at the respective UE.

At 720 (e.g., as in 406 of FIG. 4), UE 1 transmits one or more UL ranging signals to the fixed reference node on the second set of resources identified by UE 1's respective set of UL ranging resource grants. At 722 (e.g., as in 506 of FIG. 5), the fixed reference node receives UE 1's UL ranging signal(s). In particular, at 722, the fixed reference node measures ToA(s) of UE 1's UL ranging signal(s) at the fixed reference node. At 724 (e.g., as in 406 of FIG. 4), UEs 2 ... N each transmit one or more UL ranging signals to the fixed reference node on the second set of resources identified by their respective sets of UL ranging resource grants. At 726 (e.g., as in 506 of FIG. 5), the fixed reference node receives the UL ranging signal(s) from UEs 2 ... N. In particular, at 726, the fixed reference node measures ToA(s) of UL ranging signal(s) from each of UEs 2 ... N at the fixed reference node.

In the embodiment of FIG. 7, further assume that UEs 1 ... N are each scheduled to perform RTT ranging procedures at the same interval in accordance with a SPS-based protocol. So, additional RTT ranging procedures may be performed at a next slot ("Ranging Slot 2") between UEs 1 ... N and the fixed reference node without additional scheduling, and so on. It will be appreciated that Ranging Slot 2 need not be the very next successive slot after Ranging Slot 1, as the respective ranging slots may be spaced apart so as to accommodate a desired ranging periodicity for each respective UE. 728-740 with respect to Ranging Slot 1 thereby substantially correspond to 714-726 with respect to Ranging Slot 2, respectively, and as such will not be described further for the sake of brevity.

In the embodiment of FIG. 7, in a further example, the UL ranging signal transmissions by UEs 1 ... N may further be power-controlled by the fixed reference node so as to avoid automatic gain control (AGC) issues. For example, the signals exchanged between 702-712 may be used to power control the UE transmissions at 720 and 724, which may in turn be used to power control the UE transmissions at 734 and 738, and so on. For some fixed reference nodes (e.g., base stations), UEs 1 . . . N may exchange additional non-ranging signaling (e.g., data traffic) which may also be used for power control.

It will be appreciated that there are various ways in which the TOAs of the DL and UL ranging signals may be processed to compute the RTT between the fixed reference node and a particular UE. In an example, each DL ranging signal is transmitted at the startpoint of a particular symbol relative to a local clock at the fixed reference node, while each UL ranging signal is transmitted at the startpoint of a particular symbol relative to a local clock at a respective UE. Because the startpoints of the UL/DL symbol transmissions is known (or assumed), an estimate of the propagation time of the UL/DL ranging symbols can be calculated from the respective TOAs relative to the respective local clocks of the receiving or measuring devices. As noted above, the local clocks at the UE and fixed reference node are generally not synchronized to a precision that can be used for ranging, with any clock differential being canceled out by summing the one-way propagation times to derive the RTT and then dividing by 2.

Figure 8A:
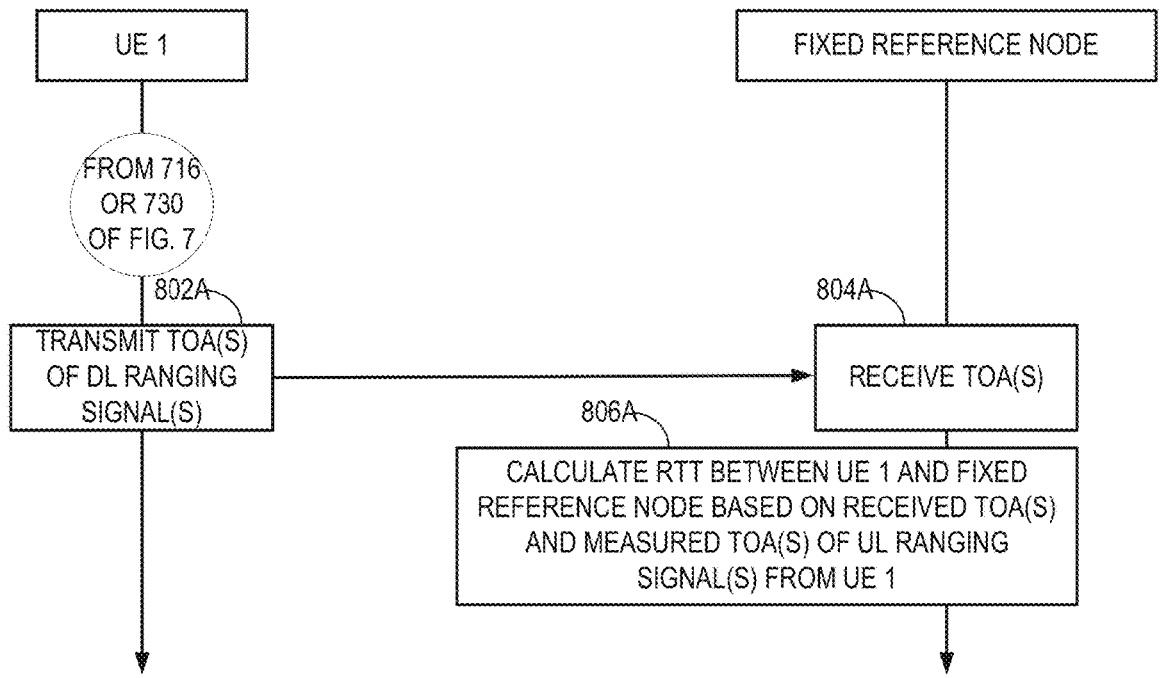
FIG. 8A illustrates an RTT calculation procedure in accordance with an embodiment of the disclosure.

FIG. 8A illustrates an RTT calculation procedure in accordance with an embodiment of the disclosure. After 716 of Ranging Slot 1 or 730 of Ranging Slot 2, at 802A, UE 1 transmits TOA(s) of the one or more DL ranging signals from 716 or 730 to the fixed reference node. At 804A, the fixed reference node receives the TOA(s) from UE 1. At 806A, the fixed reference node calculates the RTT between UE 1 and the fixed reference node based on the received TOA(s) from 804A along with the measured TOA(s) of UE 1's UL ranging signal(s) from 722 or 736. Once the RTT is calculated, the RTT can be used to help derive or refine a positioning estimate for UE 1 as noted above. While UEs 2 . . . N are not illustrated in FIG. 8A, a similar TOA exchange can be used to calculate the RTT(s) between UEs 2 . . . N and the fixed reference node as well.

Figure 8B:
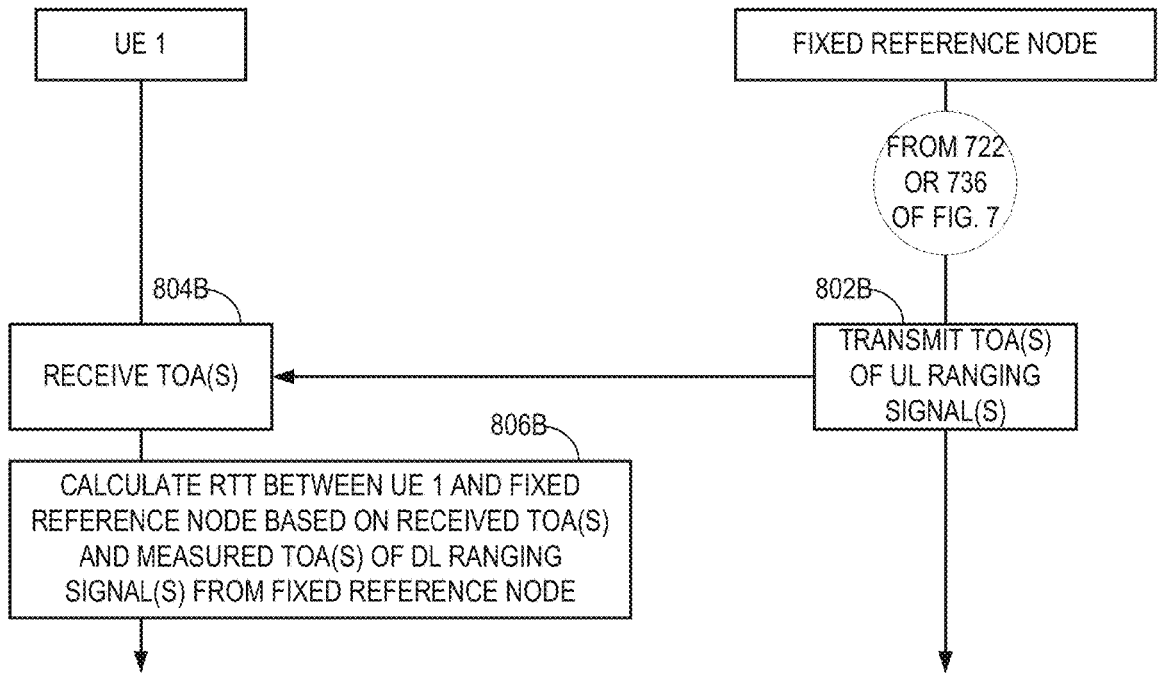
FIG. 8B illustrates an RTT calculation procedure in accordance with another embodiment of the disclosure.

FIG. 8B illustrates an RTT calculation procedure in accordance with another embodiment of the disclosure. After 722 of Ranging Slot 1 or 736 of Ranging Slot 2, at 802B, the fixed reference node transmits TOA(s) of UE 1's UL ranging signal(s) from 722 or 736 to UE 1. At 804B, UE 1 receives the TOA(s) from the fixed reference node. At 806B, the UE 1 calculates the RTT between UE 1 and the fixed reference node based on the received TOA(s) from 804B along with the measured TOA(s) of the DL ranging signal(s) from 716 or 730. Once the RTT is calculated, the RTT can be used to help derive or refine a positioning estimate for UE 1 as noted above. While UEs 2 . . . N are not illustrated in FIG. 8B, a similar TOA exchange can be used to calculate the RTT(s) between UEs 2 . . . N and the fixed reference node as well.

The embodiments of FIGS. 8A-8B can also be used in conjunction with each other, with both UE 1 and the fixed reference node separately deriving the RTT. In an example, the UL resources used for the transmission of 802A and/or the DL resources used for the transmission of 802B may be scheduled in accordance with an SPS-based protocol, similar to the scheduling of the UL/DL ranging signals, to reduce scheduling overhead.

In a further embodiment, UE 1 and/or the fixed reference node may report their respective TOAs and/or the calculated RTT to an external entity, such as the location server 230. For example, RTTs between UE 1 and multiple fixed reference nodes may be determined in conjunction with a positioning procedure for UE 1. These RTTs may be aggregated at either UE 1 or an external entity such as the location server 230 for processing in association with this positioning procedure.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method, at a user equipment (UE), of determining round trip time (RTT), comprising:
   receiving, from a fixed reference node, a set of downlink (DL) ranging resource assignments;
   receiving, from the fixed reference node, a set of uplink (UL) ranging resource grants;
   receiving one or more DL ranging signals from the fixed reference node on a first set of resources identified by the set of DL ranging resource assignments;
   measuring one or more DL times of arrival (ToAs) of the one or more DL ranging signals at the UE, wherein one or more DL startpoints of the one or more DL ranging signals correspond to beginnings of one or more DL symbols among the first set of resources; and
   transmitting one or more UL ranging signals to the fixed reference node on a second set of resources identified by the set of UL ranging resource grants.

2. The method of claim 1, further comprising receiving an indication that the set of DL ranging resource assignments and the set of UL ranging resource grants are scheduled in accordance with a semi-persistent scheduling (SPS) protocol.

3. The method of claim 1, further comprising:
   transmitting, to the fixed reference node, at least one ranging scheduling request,
   wherein the set of downlink (DL) ranging resource assignments and the set of uplink (UL) ranging resource grants are received in response to the at least one ranging scheduling request as part of a UE-initiated RTT ranging procedure.

4. The method of claim 1, wherein the set of downlink (DL) ranging resource assignments and the set of uplink (UL) ranging resource grants are received as part of a network-initiated RTT ranging procedure.

5. The method of claim 1, further comprising:
   transmitting the measured one or more DL ToAs to the fixed reference node.

6. The method of claim 1, further comprising:
   receiving, from the fixed reference node, one or more UL ToAs of the one or more UL ranging signals at the fixed reference node; and
   calculating the RTT between the UE and the fixed reference node based on the measured one or more DL ToAs and the received one or more UL ToAs.

7. The method of claim 6,
   wherein one or more UL startpoints of the received one or more UL ToAs is assumed by the calculating to correspond to beginnings of one or more UL symbols among the second set of resources.

8. The method of claim 1,
   wherein the first set of resources includes at least one of the one or more DL ranging signals in a first portion of a particular slot, and
   wherein the second set of resources includes at least one of the one or UL ranging signals in a second portion of the particular slot.

9. The method of claim 8,
   wherein the particular slot is an uplink-centric slot including a plurality of symbols, and
   wherein a number of uplink symbols of the plurality of symbols exceeds a number of downlink symbols of the plurality of symbols.

10. The method of claim 1, wherein the transmitting transmits the one or more UL ranging signals in accordance with a power control scheme.

11. The method of claim 1, wherein the fixed reference node corresponds to a base station, a roadside unit (RSU), a parked vehicle-integrated UE, or any combination thereof.

12. The method of claim 1, wherein the first set of resources and the second set of resources correspond to a set of symbols on an associated set of frequencies in accordance with a time division duplex (TDD) scheme, a set of codes in accordance with a code division multiple access (CDMA) scheme, or a combination of symbols and codes in accordance with a hybrid TDD/CDMA scheme.

13. The method of claim 1,
   wherein the receiving of the one or more DL ranging signals is performed before the transmitting of the one or more UL ranging signals, or
   wherein the receiving of the one or more DL ranging signals is performed after the transmitting of the one or more UL ranging signals.

14. A method of operating a fixed reference node, comprising:
   transmitting, to at least one user equipment (UE), a set of downlink (DL) ranging resource assignments;
   transmitting, to the at least one UE, a set of uplink (UL) ranging resource grants;
   transmitting, to the at least one UE, one or more DL ranging signals on a first set of resources identified by the set of DL ranging resource assignments;
   receiving, from the at least one UE, one or more UL ranging signals on a second set of resources identified by the set of UL ranging resource grants; and measuring one or more UL times of arrival (ToAs) of the one or more UL ranging signals at the fixed reference node, wherein one or more UL startpoints of the one or more UL ranging signals correspond to beginnings of one or more UL symbols among the second set of resources.

15. The method of claim 14, wherein the at least one UE includes a plurality of UEs.

16. The method of claim 15,
wherein the fixed reference node transmits a different set of downlink (DL) ranging resource assignments and a different set of uplink (UL) ranging resource grants via a unicast protocol to each of the plurality of UEs, or
wherein the fixed reference node transmits the same set of DL ranging resources to each of the plurality of UEs, and a different set of UL ranging resources to each of the plurality of UEs, or
any combination thereof.

17. The method of claim 14, wherein the fixed reference node is configured to schedule the set of DL ranging resource assignments and the set of UL ranging resource grants in accordance with a semi-persistent scheduling (SPS) protocol.

18. The method of claim 14, further comprising:
receiving, from the at least one UE, an at least one ranging scheduling request,
wherein the set of downlink (DL) ranging resource assignments and the set of uplink (UL) ranging resource grants are transmitted in response to the at least one ranging scheduling request as part of a UE-initiated RTT ranging procedure.

19. The method of claim 14, wherein the set of downlink (DL) ranging resource assignments and the set of uplink (UL) ranging resource grants are transmitted as part of a network-initiated RTT ranging procedure.

20. The method of claim 14, further comprising:
transmitting the measured one or more UL ToAs to the at least one UE.

21. The method of claim 14, further comprising:
receiving, from the at least one UE, one or more DL ToAs of the one or more DL ranging signals at the at least one UE; and
calculating an RTT between the at least one UE and the fixed reference node based on the measured one or more UL ToAs and the received one or more DL ToAs.

22. The method of claim 21,
wherein one or more DL startpoints of the received one or more DL ToAs is assumed by the calculating to correspond to beginnings of one or more DL symbols among the second set of resources.

23. The method of claim 14,
wherein the first set of resources includes at least one of the one or more DL ranging signals in a first portion of a particular slot, and
wherein the second set of resources includes at least one of the one or more UL ranging signals in a second portion of the particular slot.

24. The method of claim 23,
wherein the particular slot is an uplink-centric slot including a plurality of symbols, and
wherein a number of uplink symbols of the plurality of symbols exceeds a number of downlink symbols of the plurality of symbols.

25. The method of claim 23,
wherein the receiving one or more UL ranging signals comprises receiving at least one UL ranging signal from a first UE on a first symbol in the first portion of the particular slot, and
receiving at least one UL ranging signal from a second UE on a second symbol in the second portion of the particular slot.

26. The method of claim 14, wherein the one or more UL ranging signals are power controlled in accordance with a power control scheme.

27. The method of claim 14, wherein the fixed reference node corresponds to a base station, a roadside unit (RSU), a parked vehicle-integrated UE, or any combination thereof.

28. The method of claim 14, wherein the first set of resources and the second set of resources correspond to a set of symbols on an associated set of frequencies in accordance with a time division duplex (TDD) scheme, a set of codes in accordance with a code division multiple access (CDMA) scheme, or a combination of symbols and codes in accordance with a hybrid TDD/CDMA scheme.

29. A user equipment (UE), comprising:
a memory;
at least one transceiver; and
at least one processor coupled to the memory and the at least one transceiver and configured to:
receive, from a fixed reference node, a set of downlink (DL) ranging resource assignments;
receive, from the fixed reference node, a set of uplink (UL) ranging resource grants;
receive one or more DL ranging signals from the fixed reference node on a first set of resources identified by the set of DL ranging resource assignments;
measure one or more DL times of arrival (ToAs) of the one or more DL ranging signals at the UE, wherein one or more DL startpoints of the one or more DL ranging signals correspond to beginnings of one or more DL symbols among the first set of resources; and
transmit one or more UL ranging signals to the fixed reference node on a second set of resources identified by the set of UL ranging resource grants.

30. A fixed reference node, comprising:
a memory;
at least one transceiver; and
at least one processor coupled to the memory and the at least one transceiver and configured to:
transmit, to at least one user equipment (UE), a set of downlink (DL) ranging resource assignments;
transmit, to the at least one UE, a set of uplink (UL) ranging resource grants;
transmit, to the at least one UE, one or more DL ranging signals on a first set of resources identified by the set of DL ranging resource assignments;
receive, from the at least one UE, one or more UL ranging signals on a second set of resources identified by the set of UL ranging resource grants; and
measure one or more UL times of arrival (ToAs) of the one or more UL ranging signals at the fixed reference node, wherein one or more UL startpoints of the one or more UL ranging signals correspond to beginnings of one or more UL symbols among the second set of resources.

* * * * *